United States Patent
Sohn et al.

(10) Patent No.: US 9,083,085 B2
(45) Date of Patent: Jul. 14, 2015

(54) SYSTEM FOR TRANSMITTING AND RECEIVING MULTI-INPUT MULTI-OUTPUT AND METHOD FOR TRANSMITTING AND RECEIVING MULTI-INPUT MULTI-OUTPUT USING THE SAME

(71) Applicant: Electronics and Telecommunications Research Institute, Daejeon (KR)

(72) Inventors: Kyung Yeol Sohn, Daejeon (KR); Young Jo Bang, Daejeon (KR); Jun-Woo Kim, Daejeon (KR); Jae Kwon Kim, Wonju-si (KR); Youn Ok Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/247,687

(22) Filed: Apr. 8, 2014

(65) Prior Publication Data
US 2014/0301495 A1  Oct. 9, 2014

(30) Foreign Application Priority Data

Apr. 9, 2013 (KR) .......... 10-2013-0038848
Feb. 13, 2014 (KR) .......... 10-2014-0016923

(51) Int. Cl.
*H04B 7/02* (2006.01)
*H01Q 21/06* (2006.01)
*H04B 7/10* (2006.01)
*H01Q 1/24* (2006.01)
*H01Q 21/24* (2006.01)
*H01Q 21/28* (2006.01)

(52) U.S. Cl.
CPC ............ *H01Q 21/06* (2013.01); *H01Q 1/246* (2013.01); *H01Q 21/24* (2013.01); *H01Q 21/28* (2013.01); *H04B 7/10* (2013.01)

(58) Field of Classification Search
CPC ........ H04B 7/10; H04B 7/024; H04B 7/0452; H04B 7/0689; H04W 52/42
USPC .................................. 375/261, 267
See application file for complete search history.

(56) References Cited

U.S. PATENT DOCUMENTS

| | | | |
|---|---|---|---|
| 7,333,455 B1* | 2/2008 | Bolt et al. | 370/334 |
| 2008/0111740 A1 | 5/2008 | Hirabe | |
| 2008/0303699 A1* | 12/2008 | Zhang et al. | 341/67 |
| 2009/0322621 A1* | 12/2009 | Inanoglu et al. | 343/702 |
| 2010/0054212 A1* | 3/2010 | Tang | 370/335 |
| 2012/0189078 A1 | 7/2012 | Eom et al. | |
| 2012/0281781 A1* | 11/2012 | Xiao et al. | 375/267 |
| 2013/0003789 A1 | 1/2013 | Eom et al. | |

FOREIGN PATENT DOCUMENTS

| | | |
|---|---|---|
| KR | 10-2008-0044177 A | 5/2008 |
| KR | 10-2012-0086201 A | 8/2012 |
| KR | 10-2013-0007420 A | 1/2013 |

* cited by examiner

*Primary Examiner* — Don N Vo
(74) *Attorney, Agent, or Firm* — Rabin & Berdo, P.C.

(57) ABSTRACT

Provided is a method for transmitting and receiving multi-input multi-output in a wireless backhaul network, including: selecting at least one pair of dual-polarized transmitting antennas to be activated among pairs of dual-polarized transmitting antennas of a transmitter; transmitting a signal through the selected pairs of dual-polarized transmitting antennas; and receiving, by pairs of dual-polarized receiving antennas of a receiver, the signal transmitted from the transmitter.

15 Claims, 11 Drawing Sheets

SYSTEM FOR TRANSMITTING AND RECEIVING MULTI-INPUT MULTI-OUTPUT AND METHOD FOR TRANSMITTING AND RECEIVING MULTI-INPUT MULTI-OUTPUT USING THE SAME

CROSS-REFERENCE TO RELATED APPLICATION

This application claims priority to and the benefit of Korean Patent Application No. 10-2013-0038848 and 10-2014-0016923 filed in the Korean Intellectual Property Office on Apr. 9, 2013 and Feb. 13, 2014, the entire contents of which are incorporated herein by reference.

BACKGROUND OF THE INVENTION (a) Field of the Invention

The present invention relates to a system for transmitting and receiving multi-input multi-output, and a method for transmitting and receiving multi-input multi-output using the same.

(b) Description of the Related Art

Among technologies which have received attention as a core technology of fourth generation mobile communication, a multi-input multi-output (MIMO) technology is based on a multi-antenna signal processing method for transmitting and receiving data using a plurality of antennas.

The multi-input multi-output technology is an essential technology to expand a wireless communication range and increase a data transmission rate by transmitting at least two data signals through the same radio channel using several antennas. The multi-input multi-output technology has been applied to recent mobile communication network systems, such as long term evolution (LTE) and mobile WiMAX.

At present, to keep up with the generalization of mobile communications and the activation of wireless wideband data communications, converting various frequency bands into available frequency bands has been conducted so as to sufficiently secure a frequency band. In connection with this, a wireless backhaul network technology of transmitting data between remote nodes which wirelessly communicate with a toll center connected to a core network has been introduced.

Further, the wireless backhaul network makes a backhaul of an IT infrastructure network including a next-generation mobile communication network into a wireless type, and when a wireless network based on a small cell base station is connected to a mobile core network (EPC backbone network), provides flexible network interworking and cost saving to smooth construction of a mobile wireless network.

However, the method for transmitting and receiving a multi-input multi-output technology according to the related art may transmit only one virtual data stream since a rank of a MIMO channel becomes 1 in the wireless backhaul network of a line of sight (LOS) environment, thereby making it difficult to increase transmission capacity.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system for transmitting and receiving multi-input multi-output and a method for transmitting and receiving multi-input multi-output capable of transmitting and receiving a signal through a dual-polarized antenna.

An exemplary embodiment of the present invention provides a method for transmitting and receiving multi-input multi-output in a wireless backhaul network, including: selecting at least one pair of dual-polarized transmitting antennas to be activated among pairs of dual-polarized transmitting antennas of a transmitter; transmitting a signal through the selected pairs of dual-polarized transmitting antennas; and receiving, by pairs of dual-polarized receiving antennas of a receiver, the signal transmitted from the transmitter.

The selecting may include selecting the antenna to be activated by using a bit signal associated with the number of pairs of dual-polarized transmitting antennas of the transmitter.

The transmitting of the signal may include transmitting a quadrature amplitude modulation (QAM) symbol selected by the bit signal associated with constellation.

The receiving of the signal may include detecting a signal by applying a maximum likelihood (ML) signal detection technique to the received signal.

The receiving may include receiving, by the pairs of dual-polarized receiving antennas having an angle relatively similar to an angle between the pairs of dual-polarized transmitting antennas through which the transmitter transmits a signal, signals, when an angle between the pairs of dual-polarized transmitting antennas of the transmitter is set to minimize an error probability of the receiver.

Another embodiment of the present invention provides a method for transmitting and receiving multi-input multi-output in a wireless backhaul network, including: transmitting, by a dual-polarized transmitting antenna of a transmitter, at least one virtual data stream; and receiving, by a dual-polarized receiving antenna of a receiver, at least one virtual data stream.

The at least one virtual data stream may include a bit signal associated with the number of pairs of dual-polarized transmitting antennas of the transmitter and a bit signal associated with a constellation.

In the transmitting, the virtual data stream may be transmitted using 4-QAM constellation or 16-QAM constellation.

The transmitter may be disposed by controlling an angle between the dual-polarized transmitting antennas of the transmitter so as to minimize an error probability of the receiver.

The error probability may be associated with an angle between the dual-polarized transmitting antennas selected by the transmitter or constellation to be used to transmit a signal.

Yet another embodiment of the present invention provides a system for transmitting and receiving multi-input multi-output, including: a transmitter including at least one pair of dual-polarized transmitting antennas and selecting a pair of dual-polarized transmitting antennas to be activated among the least one pair of dual-polarized transmitting antennas to transmit a signal; and a receiver including at least one pair of dual-polarized receiving antennas receiving the signal through the pairs of dual-polarized receiving antennas corresponding to the pair of dual-polarized transmitting antennas.

The pair of dual-polarized transmitting antennas may include a vertical polarization antenna and a horizontal polarization antenna.

The transmitter may be disposed so that the at least one pair of dual-polarized transmitting antennas is inclined as much as a predetermined angle with respect to the dual-polarized transmitting antenna which is a reference.

The transmitter may transmit a quadrature amplitude modulation (QAM) symbol selected by the bit signal associated with constellation.

The transmitter may be disposed so that angles between the dual-polarized transmitting antennas of the transmitter are the same, when using the 4-QAM constellation.

The transmitter may be disposed so that an angle between the dual-polarized transmitting antennas becomes an angle to minimize an error probability of the receiver, when using 16-QAM constellation.

The transmitter may include a toll center which is connected to a core network, and the receiver may include at least one remote node which wirelessly communicates with the tool center using a carrier frequency of 10 GHZ or more.

According to the exemplary embodiments of the present invention, it is possible to provide the environment to minimize the error probability while increasing the transmission capacity by controlling the angle between the dual-polarized transmitting antennas to dispose the dual-polarized transmitting antenna and transmitting the signal by selecting the antenna using at least one virtual data stream, when the signal is transmitted and received using the dual-polarized antenna.

DETAILED DESCRIPTION OF THE EMBODIMENTS

Figure 1:
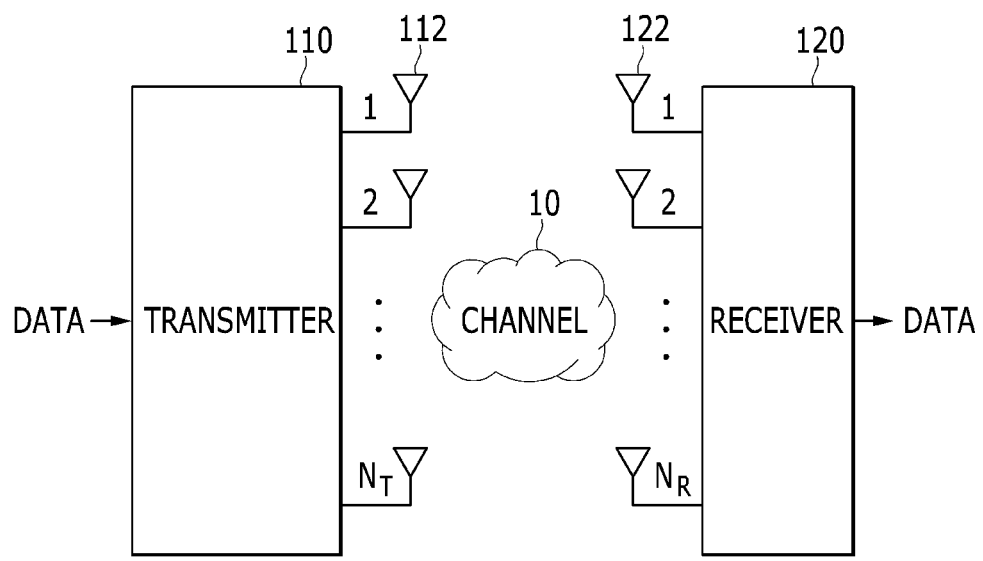
FIG. 1 is a block diagram of a system for transmitting and receiving multi-input multi-output in a wireless communication system.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In addition, the terms "-er", "-or", and "module" described in the specification mean units for processing at least one function or operation, and can be implemented by hardware components or software components and combinations thereof.

Hereinafter, a system for transmitting and receiving multi-input multi-output and a method for transmitting and receiving multi-input multi-output using the same will be described in detail with reference to the accompanying drawings.

FIG. 1 is a block diagram of a system for transmitting and receiving multi-input multi-output in a wireless communication system. In this case, for description of an exemplary embodiment of the present invention, only essential components of a system for transmitting and receiving multi-input multi-output are schematically illustrated, but the system for transmitting and receiving multi-output and multi-output is not limited thereto.

The system for transmitting and receiving multi-input multi-output according to the exemplary embodiment of the present invention is a technology of increasing a channel capacity by controlling the number of dual-polarized antennas and an antenna angle at the time of transmitting and receiving multi-input multi-output using the dual-polarized antenna in a wireless backhaul network, and simply performs optimal signal detection using orthogonality of the dual-polarized antenna.

At the time of disposing the antenna to transmit and receive a general multi-input multi-output (hereinafter referred to as MIMO) in the existing wireless communication system, a method for transmitting and receiving MIMO increasing a transmission capacity using a plurality of antennas has a problem in that a tower space equipped with the antenna may be insufficient, rental cost of the tower may be increased, it is difficult to effectively manage the antenna, and the like.

Further, a rich scattering environment is required to increase the transmission capacity using the existing method for transmitting and receiving MIMO, but the exemplary embodiment of the present invention handles a wireless backhaul network of a line of sight (hereinafter referred to as LOS) environment, and therefore it is difficult to increase the transmission capacity using the existing MIMO technology.

Therefore, the system for transmitting and receiving multi-input and multi-output according to the exemplary embodiment of the present invention increases the transmission capacity in the wireless backhaul network of the LOS environment by using a basic concept of space shift keying (hereinafter referred to as SSK), Bi-SSK, and spatial modulation (hereinafter referred to as SM) types which transfers information using an antenna index to be activated.

First, the SSK type is a type for selecting one transmission antenna which is activated depending on bit information to transmit signal 1, and the Bi-SSK type is a type for selecting two transmitting antennas which are activated depending on bit information to transmit signals 1 and j. Further, the SM type is a type for selecting a transmission symbol through additional bit information while selecting the antenna which is activated in the same type as the SSK type to increase the transmission capacity.

The system for transmitting and receiving multi-input and multi-output according to the exemplary embodiment of the present invention increases the transmission capacity by using the multi dual-polarized antenna, and in this case, uses the concept of the SSK type, the Bi-SSK type, or the SM type to increase the transmission capacity in the wireless backhaul network of the LOS environment.

Referring to FIG. 1, the system for transmitting and receiving multi-input multi-output according to the exemplary embodiment of the present invention includes a transmitter 110 and a receiver 120.

The transmitter 110 includes at least one pair of dual-polarized transmitting antennas 112, and transmits data to the receiver 120 through a radio channel 10. In this configuration, the transmitter 110 may include a toll center which is connected to a core network.

Further, the receiver may include remote nodes which wirelessly communicate with the toll center by using a carrier frequency of 10 GHz or more, and includes at least one pair of dual-polarized receiving antennas 122

First, the system for transmitting and receiving multi-input multi-output selects a pair of dual-polarized antennas which is activated depending on $\log_2 N_T$ and then allows a vertical antenna and a horizontal antenna of the selected dual-polarized antenna to transmit a signal of $2 \log_2 |\Omega|$ bits. In this case, the dual-polarized antenna transmits a symbol of quadrature amplitude modulation (hereinafter referred to as QAM).

In this case, in $\lfloor \log_2 N_T \rfloor$, $N_T$ is the number of pairs of dual-polarized transmitting antennas which are present in the transmitter 110. Therefore, if four pairs of dual-polarized transmitting antennas are present in the transmitter 100, as the number of bits required to activate this, $\lfloor \log_2 N_T \rfloor = \lfloor \log_2 4 \rfloor = 2$, that is, 2 bits, are required.

Further, $|\Omega|$ in $2 \log_2 |\Omega|$ represents the number of points in a constellation. In the case of 4-QAM, $|\Omega|$ is equal to 4, and in the case of 16-QAM, $|\Omega|$ is equal to 16. Therefore, to transmit data using the 4-QAM, $\log_2 4 = 2$ bits are required, and to transmit data using the 16-QAM, $\log_2 16 = 4$ bits are required.

Further, the system for transmitting and receiving multi-input multi-output according to the exemplary embodiment of the present invention may transmit the $\log_2 |\Omega|$ bit through the vertical antenna and transmit the $\log_2 |\Omega|$ bit through the horizontal antenna, and therefore may transmit two-fold $\log_2 |\Omega|$.

As the result, the system for transmitting and receiving multi-input multi-output increases the transmission capacity like $\lfloor \log_2 N_T \rfloor + 2 \log_2 |\Omega|$ bps/Hz.

That is, the system for transmitting and receiving multi-input multi-output transmits at least one virtual data stream through the dual-polarized transmitting antenna of the transmitter 110, and receives the virtual data stream from the dual-polarized receiving antenna of the receiver 120. Here, the virtual data stream includes bit signals associated with the number of pairs of dual-polarized transmitting antennas of the transmitter 110 and bit signals associated with the constellation.

When the existing multi-input multi-output antenna technology is applied in the existing wireless backhaul network, a rank of a channel becomes 1, and thus a maximum of only one stream may be transmitted, but the exemplary embodiment of the present invention uses the multiple dual-polarized antenna transmitting at least two virtual data streams to increase the transmission capacity.

Further, the system for transmitting and receiving multi-input multi-output performs the selection of the dual-polarized antennal to be activated depending on the information to improve the data transmission rate, and controls and disposes an angle between the dual-polarized antennas so that the entire data transmission rate is maximal.

Figure 2:
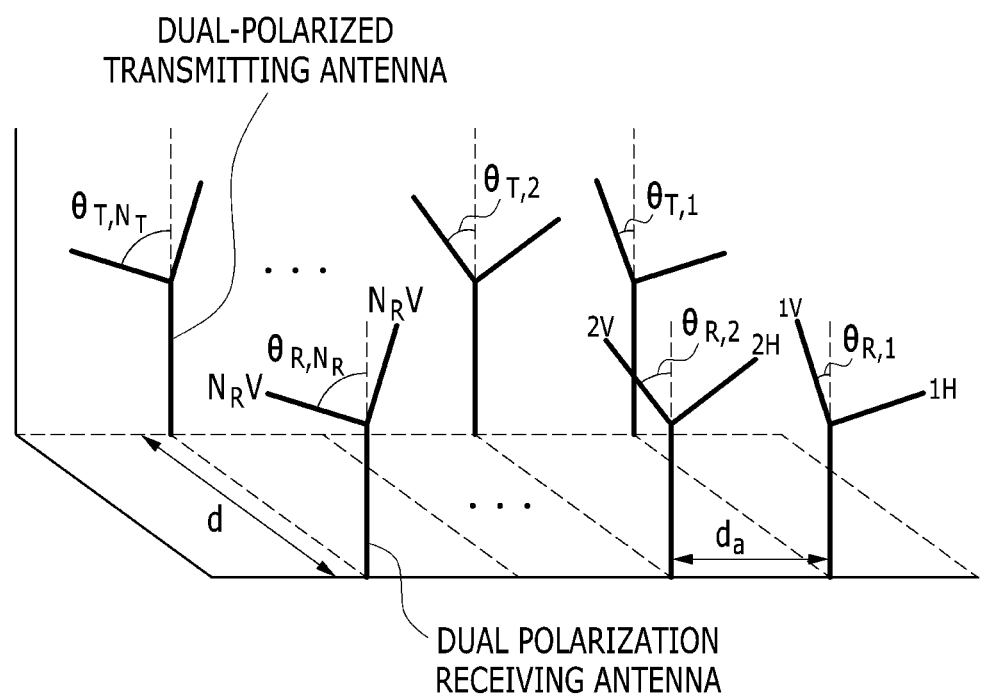
FIG. 2 is a diagram illustrating a dual-polarized transmitting antenna and a dual-polarized receiving antenna according to an exemplary embodiment of the present invention.

FIG. 2 is a diagram illustrating a dual-polarized transmitting antenna and a dual-polarized receiving antenna according to an exemplary embodiment of the present invention.

Referring to FIG. 2, in the system for transmitting and receiving multi-input multi-output according to the exemplary embodiment of the present invention, the disposition of the antennas for transmitting and receiving MIMO using the plurality of dual-polarized antennas is illustrated. First, the channel using the dual-polarized antenna is represented by the following Equation 1.

$$H = \begin{bmatrix} h_{HH} & h_{HV} \\ h_{VH} & h_{VV} \end{bmatrix} \quad \text{(Equation 1)}$$

$$= e^{-j2\pi d/\lambda} \begin{bmatrix} \cos(\theta_T - \theta_R) & -\sin(\theta_T - \theta_R) \\ \sin(\theta_T - \theta_R) & \cos(\theta_T - \theta_R) \end{bmatrix}$$

In the above Equation 1, d represents a distance between the dual-polarized transmitting antenna and the dual-polarized receiving antenna, and $d_a$ represents a distance between the adjacent dual-polarized transmitting antennas or a distance between the dual-polarized receiving antennas. In this case, assume that $\sqrt{d^2 + d_a^2} \approx d$. In the system for transmitting and receiving multi-input multi-output according to the exemplary embodiment of the present invention, the MIMO system configured to include $N_T$ dual-polarized transmitting antennas and $N_R$ receiving antennas is considered, and the transmitting and receiving relationship is represented by the following Equation 2.

$$y = H_i x + z \quad \text{(Equation 2)}$$

$x = [x_1 \ x_2]^T$ represents a transmitting signal vector and $y = [y_1 \ y_2 \ldots y_{N_R}]^T$ means a received signal vector. $x = [x_1 \ x_2]_T$ Further, assume that a noise vector $z = [z_1 \ z_2 \ldots z_{N_R}]^T$ is white Gaussian noise. Further, $H_i = [h_i \ h_{i+N_T}]$ means a channel gain matrix between the activated dual-polarized transmitting antenna and dual-polarized receiving antenna.

Further, a maximum likelihood (ML) signal detection technique which is an optimal signal detection technique is as the following Equation 3.

$$[\hat{i}^{opt}, \hat{x}^{opt}] = \underset{\hat{i}, \hat{x}}{\arg\min} \ \|y - H_i \hat{x}\|^2 \quad \text{(Equation 3)}$$

Since the orthogonality between a plurality of polarizations is kept in the LOS environment in which a multi-path is minimized, when the receiver 120 uses the relationship $H_i^H H_i = N_R I_{2 \times 2} \ \forall i$ of and the orthogonality of the dual-polarized antenna, the maximum likelihood signal detection of Equation 3 is simply modified depending on the following Equation 4. Here, D [•] represents a QAM slicer and opt represents an optimal value as the abbreviation for optimal or optimum.

$$[\hat{i}^{opt}, \hat{x}^{opt}] = \underset{\hat{i}, \hat{x}}{\arg\min} \ \|H_i^H y - H_i^H H_i \hat{x}\|^2 \quad \text{(Equation 4)}$$

$$= \underset{\hat{i}, \hat{x}}{\arg\min} \ \|H_i^H y / N_R - \hat{x}\|$$

$$= \underset{\hat{i}, \hat{x}}{\arg\min} \ (|h_i^H y / N_R - \hat{x}_1|^2 + |h_{i+N_T}^H y / N_R - \hat{x}_2|^2)$$

-continued $$= \underset{\hat{i}}{\arg\min} \begin{pmatrix} |h_i^H y/N_R - D[h_i^H y/N_R]|^2 + \\ \left| \begin{array}{c} h_{i+N_T}^H y/N_R - \\ D[h_{i+N_T}^H y/N_R] \end{array} \right|^2 \end{pmatrix}$$

Further, an error probability of the type proposed in the exemplary embodiment of the present invention uses $Q(x) = \int_x^\infty \exp(-t^2/2)/\sqrt{2\pi} \, dt$ along with the relationship between Equations 3 and 4, and thus is represented by the following Equation 5.

$$P([i, x] \to [\hat{i}^{opt}, \hat{x}^{opt}] \mid H) = P(\|y - H_i x\|^2 > \|y - H_{\hat{i}^{opt}} \hat{x}^{opt}\|^2) \quad \text{(Equation 5)}$$

$$= P\begin{pmatrix} 2\Re\{-z^H(H_i x - H_{\hat{i}^{opt}} \hat{x}^{opt})\} > \\ \|H_i x - H_{\hat{i}^{opt}} \hat{x}^{opt}\|^2 \end{pmatrix}$$

$$= Q\left(\sqrt{\|H_i x - H_{\hat{i}^{opt}} \hat{x}^{opt}\|^2 / 2\sigma_z^2}\right)$$

Further, an optimal angle between the dual-polarized antennas to minimize the error probability may be obtained by the following Equation 6 based on the above Equation 5.

$$[\Theta_T^{opt}, \Theta_R^{opt}] = \underset{\Theta_T, \Theta_R}{\arg\max} \underset{i, \hat{i}^{opt}, x, \hat{x}^{opt}}{\min} \|H_i x - H_{\hat{i}^{opt}} \hat{x}^{opt}\|^2 \quad \text{(Equation 6)}$$

$$\approx \underset{\Theta_T, \Theta_R}{\arg\max} \underset{i, \hat{i}^{opt}, x, \hat{x}^{opt}}{\min} \left\| \begin{array}{c} \sqrt{N_R} x - \\ (H_i/\sqrt{N_R})^H H_{\hat{i}^{opt}} \hat{x}^{opt} \end{array} \right\|^2$$

Here, $(H_i/\sqrt{N_R})^H H_{\hat{i}^{opt}}$ of the above Equation 6 is represented by a rotating matrix $R_{t,\hat{i}^{opt}}$ as follows by a formula of a trigonometric function.

$$(H_i/\sqrt{N_R})^H H_{\hat{i}^{opt}} = \sqrt{N_R} \begin{bmatrix} \cos\begin{pmatrix} \theta_{T,i} - \\ \theta_{T,\hat{i}^{opt}} \end{pmatrix} & \sin\begin{pmatrix} \theta_{T,i} - \\ \theta_{T,\hat{i}^{opt}} \end{pmatrix} \\ -\sin\begin{pmatrix} \theta_{T,i} - \\ \theta_{T,\hat{i}^{opt}} \end{pmatrix} & \cos\begin{pmatrix} \theta_{T,i} - \\ \theta_{T,\hat{i}^{opt}} \end{pmatrix} \end{bmatrix} \quad \text{(Equation 7)}$$

$$= \sqrt{N_R} \, R_{t,\hat{i}^{opt}}$$

It may be appreciated that the error probability is not affected by an angle $\Theta_R$ between the dual-polarized receiving antennas of the receiver 120 depending on the above Equation 7. In conclusion, the error performance depends on the angle $\Theta_T$ between the dual-polarized transmitting antennas of the transmitter 110 and the constellation. Further, the optimal angle between the dual-polarized transmitting antennas is represented by the following Equation 8 which is acquired by collectively considering the above Equations 6 and 7.

$$[\Theta_T^{opt}, \Theta_R^{opt}] = \quad \text{(Equation 8)}$$

$$\underset{\Theta_T, \Theta_R}{\arg\max} \underset{i, \hat{i}^{opt}, x, \hat{x}^{opt}}{\min} \|\sqrt{N_R} x - \sqrt{N_R} R_{i,\hat{i}^{opt}} \hat{x}^{opt}\|^2$$

Further, the system for transmitting and receiving multi-input multi-output according to the exemplary embodiment of the present invention considers the 4-QAM and 16-QAM constellations.

Figure 3:
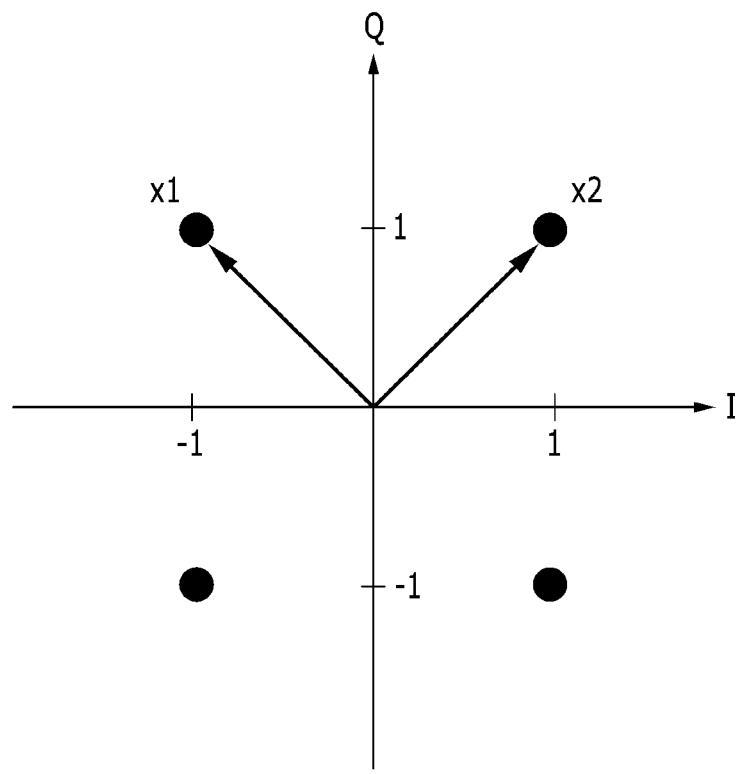
FIG. 3 is a diagram illustrating a distance between 4-QAM constellation points in a pair of dual-polarized antennas.
Figure 4:
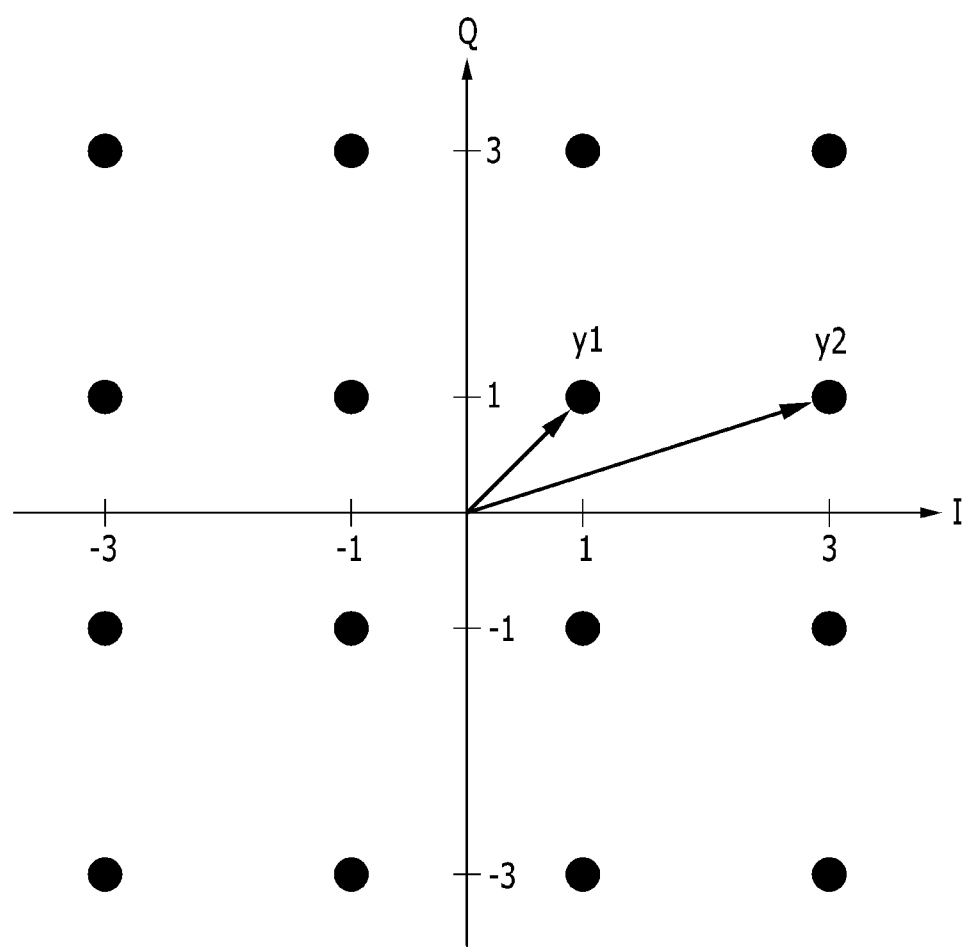
FIG. 4 is a diagram illustrating a distance between 16-QAM constellation points in a pair of dual-polarized antennas.

FIG. 3 is a diagram illustrating the distance between the constellations of the 4-QAM in the pair of dual-polarized antennas, and FIG. 4 is a diagram illustrating the distance between the constellations of the 16-QAM in the pair of dual-polarized antennas. Here, each point in FIGS. 3 to 7 represents a constellation point.

As illustrated in FIG. 3, in the case of the 4-QAM, each distance from an original point to points x1 and x2 is the same. However, as illustrated in FIG. 4, in the case of the 16-QAM, it can be appreciated that distances from the original point to points y1 and y2 are different from each other.

As such, in the case of the 4-QAM, the distances between all the constellation points are the same and therefore the optimal angle between the transmitting dual-polarized antennas is the same angle as represented by the following Equation 9.

$$\theta_{T,i,4QAM}^{opt} = \frac{(i-1)\pi}{2N_T} + \theta_0, \quad \text{(Equation 9)}$$

$$i = 1, 2, \ldots, N_T$$

Figure 5:
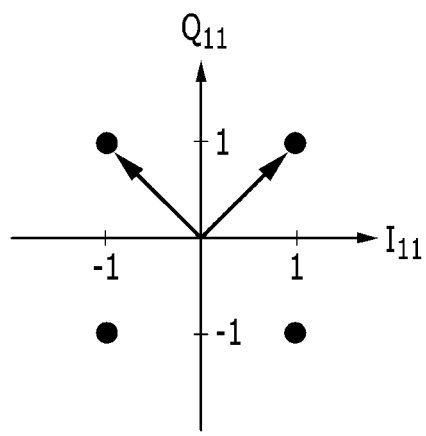
FIG. 5 is a diagram illustrating the distance between 4-QAM constellation points at the time of using two pairs of dual-polarized antennas according to the exemplary embodiment of the present invention.
Figure 5:
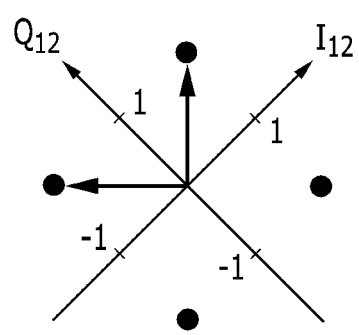
Figure 5:
Figure 5:
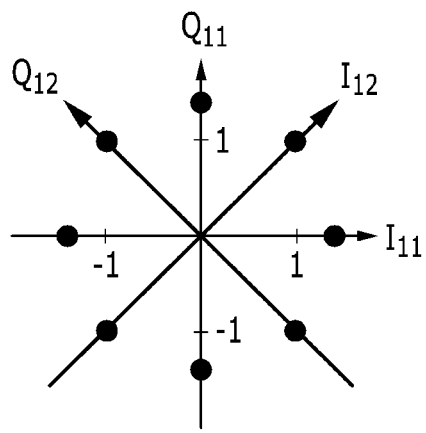

FIG. 5 is a diagram illustrating the distance between the 4-QAM constellation points at the time of using two pairs of dual-polarized antennas according to the exemplary embodiment of the present invention.

When the two pairs of dual-polarized antennas are used and the signal is transmitted based on the 4-QAM, the angle between the dual-polarized transmitting antennas to allow the receiver 120 to obtain the optimal performance may be linearly obtained by 0° and 45° as in the following Equation 10 using Equation 8 or 9.

$$\frac{(i-1)\cdot\pi}{2N_T}, i = 1, 2 \quad \text{(Equation 10)}$$

However, in the case of the 16-QAM, the distances between the constellation points are different from each other and therefore are irregular depending on $N_T$ and are difficult to mathematically analyze. Therefore, the optimal angle between the dual-polarized antennas which sets the minimum distance of Equation 8 to be maximal is obtained by simulation.

Figure 6:
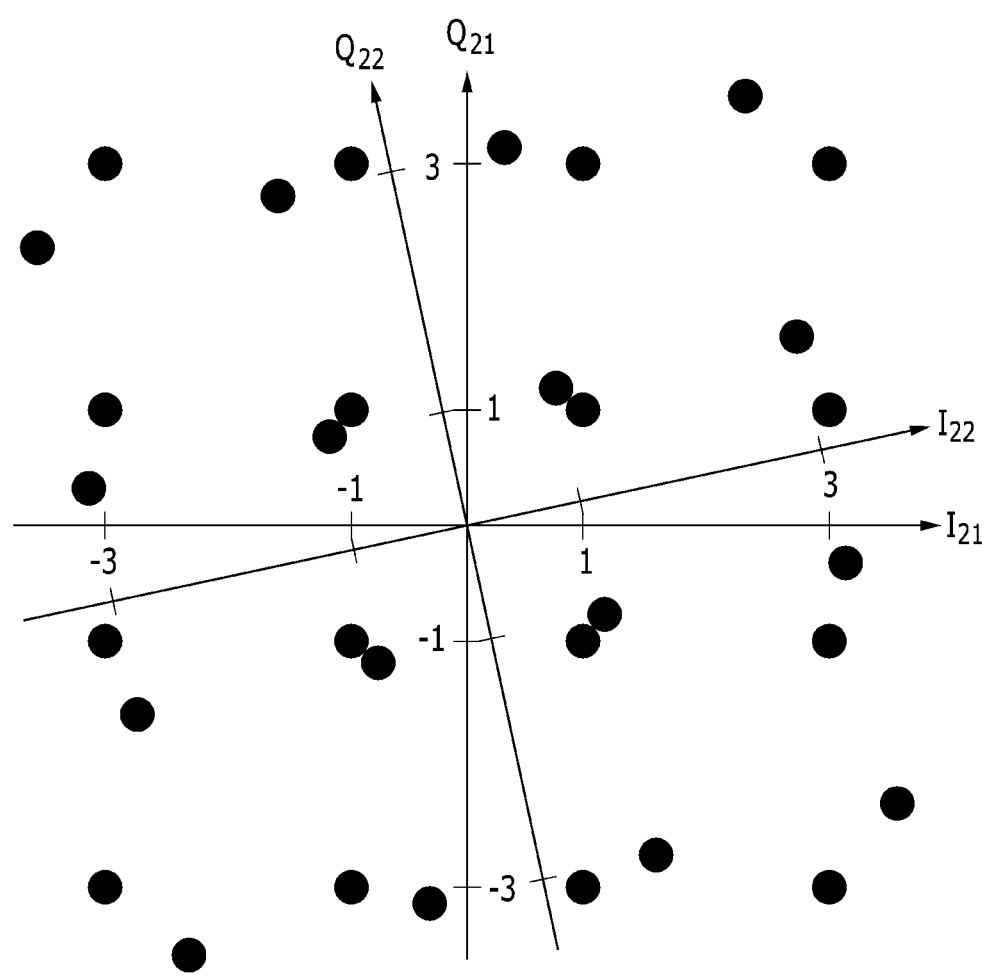
FIG. 6 is a diagram illustrating a distance between 16-QAM constellation points at the time of using the two pairs of dual-polarized antennas according to the exemplary embodiment of the present invention.
Figure 7:
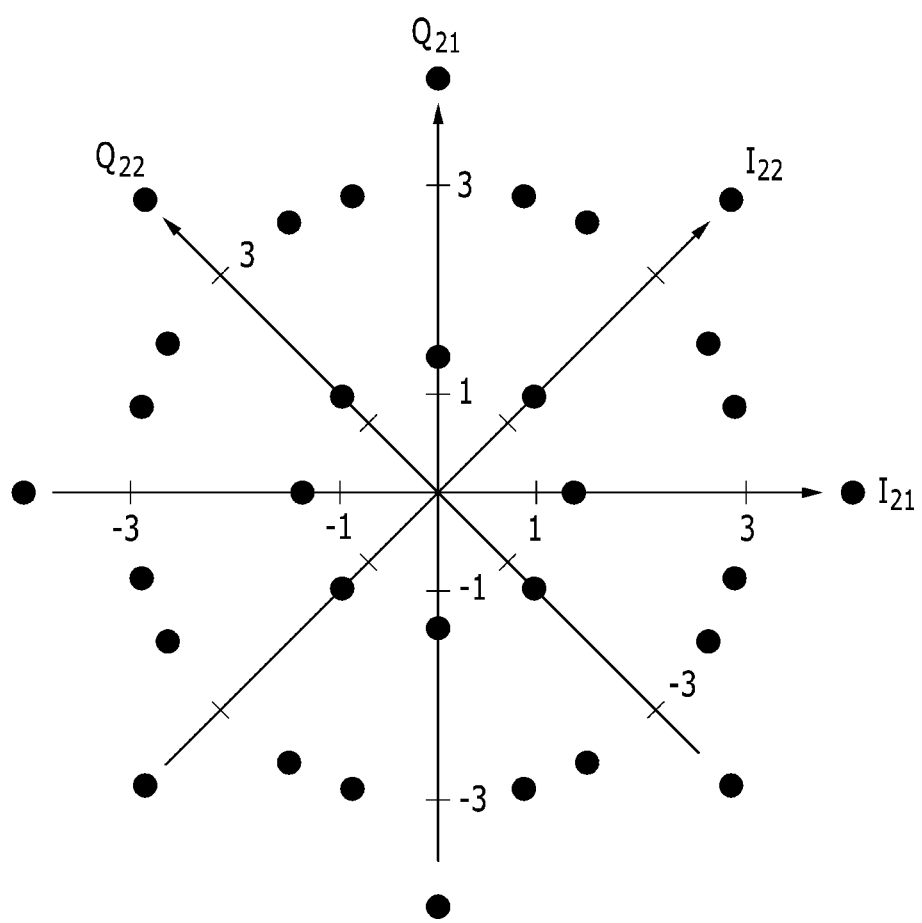
FIG. 7 is a diagram illustrating a distance between 16-QAM constellation points at the time of using two pairs of dual-polarized antennas according to another exemplary embodiment of the present invention.

FIG. 6 is a diagram illustrating a distance between 16-QAM constellation points at the time of using the two pairs of dual-polarized antennas according to the exemplary embodiment of the present invention, and FIG. 7 is a diagram illustrating a distance between 16-QAM constellation points at the time of using two pairs of dual-polarized antennas according to another exemplary embodiment of the present invention.

As illustrated in FIGS. 6 and 7, when the two pairs of dual-polarized antennas are used and the signal is transmitted by the 16-QAM, the linear angle between the double-polarized transmitting antennas to allow the receiver 120 to obtain the optimal performance may not be obtained. Therefore, in the case of the 16-QAM, the angle between the double-polarized transmitting antennas is obtained by the simulation.

Further, the system for transmitting and receiving multi-input multi-output according to the exemplary embodiment of the present invention disposes the dual-polarized transmitting antenna of the transmitter 110 at different angles so as to simply detect the signal depending on the characteristics of the dual-polarized antennal. For example, each dual-polarized transmitting antenna is disposed to be inclined as much as a predetermined angle with respect to the dual-polarized transmitting antenna which is a reference.

Figure 8A:
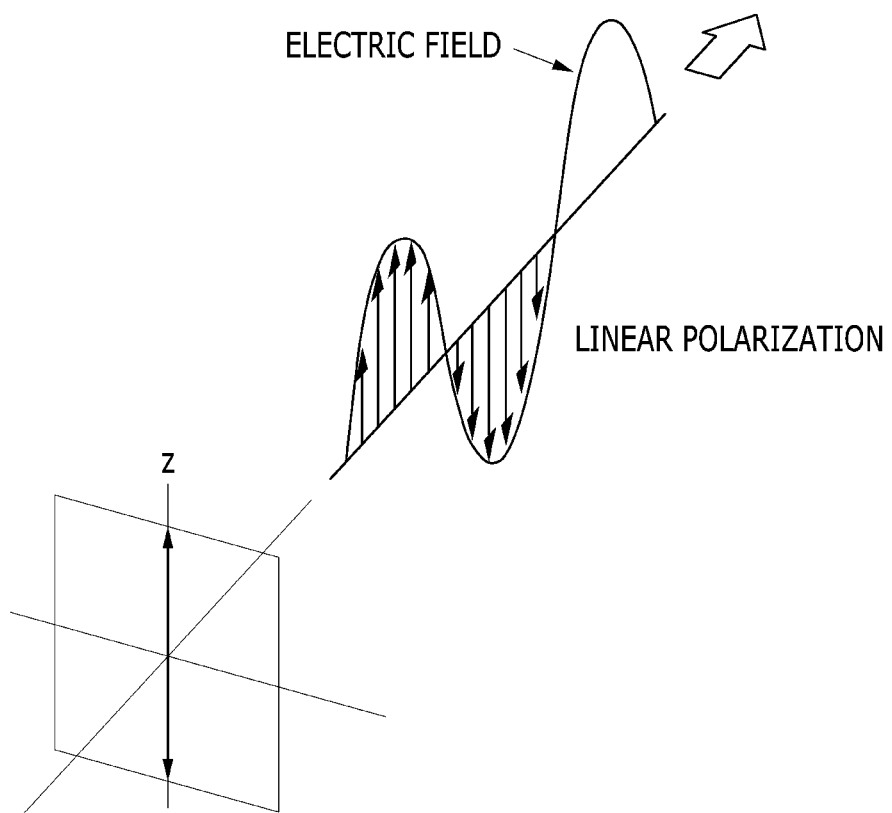
FIGS. 8A to 8C are diagrams illustrating an example of an electric field trajectory by the dual-polarized antenna.
Figure 8B:
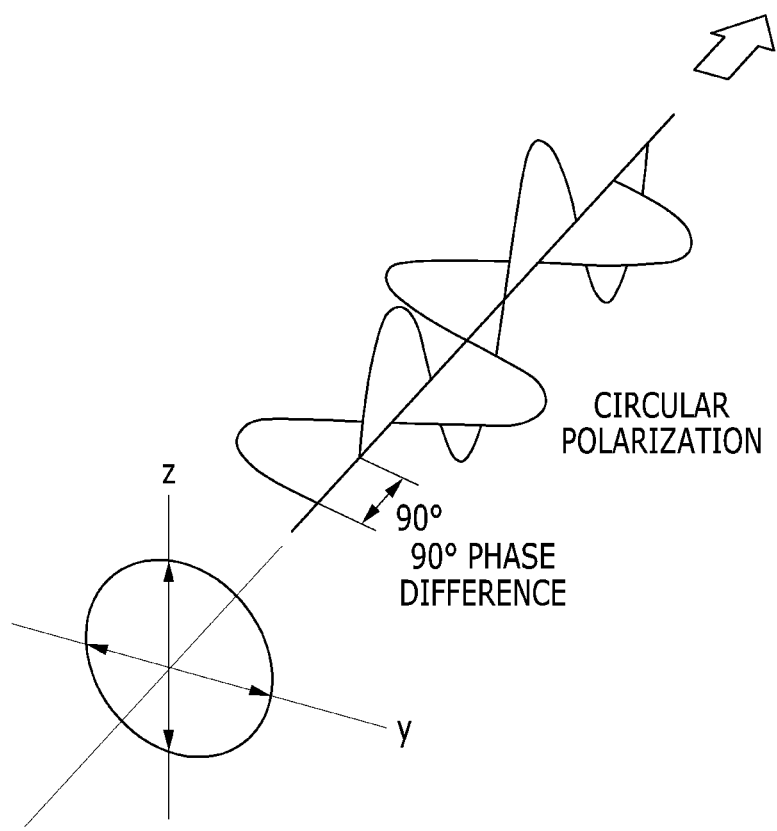
Figure 8C:
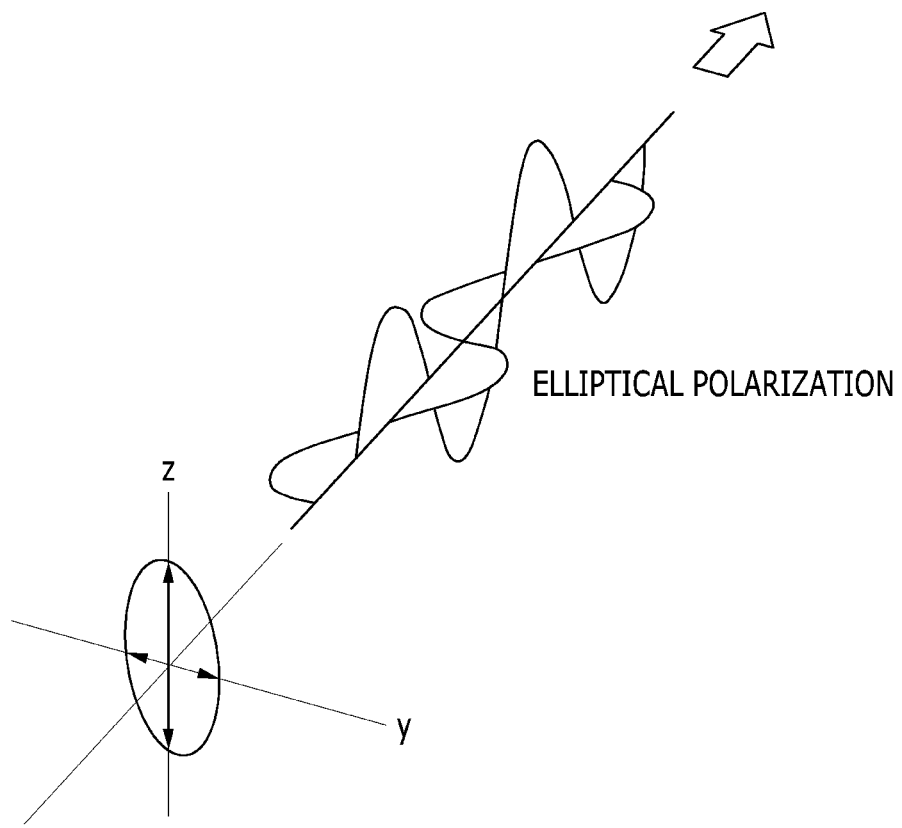

FIGS. 8A to 8C are diagrams illustrating an example of an electric field trajectory by the dual-polarized antenna.

First, the polarization represents characteristics of the trajectory which is made by the electric field perpendicular to a progressing direction of an electromagnetic wave, and may be classified into linear (straight), circular, and elliptical polarizations as illustrated in FIG. 3.

For example, assume that the dual-polarized transmitting antenna and the dual-polarized receiving antenna which have the linear polarization characteristics are used and that no reflection, scattering, or diffraction is present by a reflector or obstacles therebetween. Next, the signal of the dual-polarized transmitting antenna transmitting only the vertical polarization may be received only by the dual-polarized receiving antenna which receives only the vertical polarization. Next, the signal of the dual-polarized transmitting antenna transmitting only the vertical polarization may not be received by the dual-polarized receiving antenna which receives only the horizontal polarization.

The dual-polarized transmitting antenna which transmits only the vertical polarization transmits the signal while being inclined by 45°

Further, in the case of comparing the antenna which receives only the vertical polarization without being inclined as much as 45° with the signal received by the antenna receiving only the vertical polarization while being inclined as much as 45°, it can be appreciated that the received signal of the antenna receiving only the vertical polarization while being inclined as much as 45° is relatively large.

Therefore, the system for transmitting and receiving multi-input multi-output according to the exemplary embodiment of the present invention disposes the dual-polarized transmitting antenna of the transmitter 110 at different angles depending on the characteristics of the dual-polarized antennal as described above.

Figure 9:
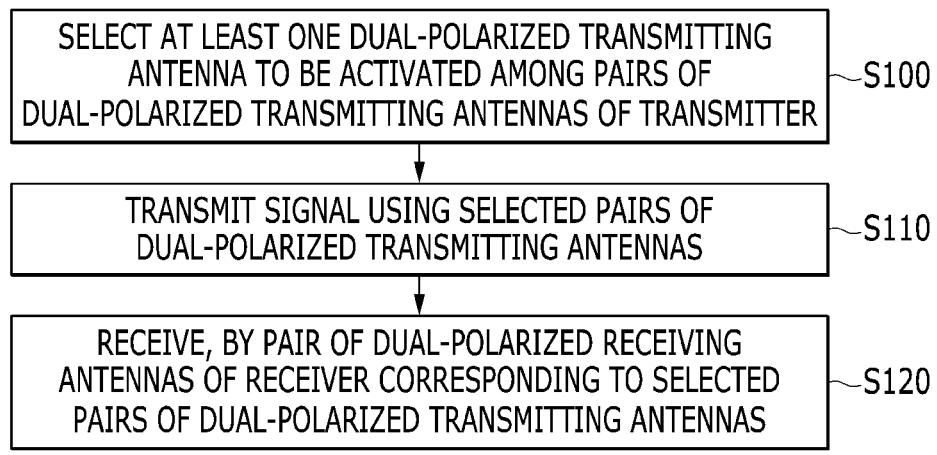
FIG. 9 is a flowchart describing a method for transmitting and receiving multi-input multi-output according to an exemplary embodiment of the present invention.

FIG. 9 is a flowchart for describing a method of transmitting and receiving multi-input multi-output according to an exemplary embodiment of the present invention.

Referring to FIG. 9, the system for transmitting and receiving multi-input multi-output according to the exemplary embodiment of the present invention selects at least one pair of dual-polarized antennas to be activated among the pairs of dual-polarized transmitting antennas of the transmitter 110 (S100).

In this case, in the system for transmitting and receiving multi-input multi-output according to the exemplary embodiment of the present invention, NT pairs of dual-polarized transmitting antennas are present in the transmitter 110 and the angle between the pairs of dual-polarized transmitting antennas is disposed using the results obtained by Equation 6 or 8.

Further, the system for transmitting and receiving multi-input multi-output transmits the signal using the pairs of dual-polarized transmitting antennas selected by the transmitter 110 (S110).

In detail, the system for transmitting and receiving multi-input multi-output first uses the $\lfloor \log_2 N_T \rfloor$ bit to select the pairs of dual-polarized transmitting antennas to be used for transmission. Further, each vertical polarization antenna or each horizontal polarization antenna which is present in the selected dual-polarized transmitting antenna uses the 4-QAM or 16-QAM constellation to transmit the $\log_2|\Omega|$ bit signal.

Therefore, the information transmitted by the pair of dual-polarized antennas corresponds to 2 $\log_2|\Omega|$ bits and the transmitter 110 may transmit a maximum sum of $\lfloor \log_2 N_T \rfloor$ and 2 $\log_2|\Omega|$ bits to the receiver 120 through the pair of dual-polarized antennas.

Further, in the system for transmitting and receiving multi-input multi-output, the pairs of dual-polarized receiving antennas of the receiver 120 corresponding to the selected pairs of dual-polarized transmitting antennas receive the signal (S120).

In this case, the same NT pairs of dual-polarized receiving antennas as one used in the transmitter 110 are present in the receiver 120, and each antenna uses the signal detection technique of the maximum likelihood type given in Equation 3 or 4 for the received signal.

In the method for transmitting and receiving multi-input multi-output according to the exemplary embodiment of the present invention, the receiving performance of the receiver 120 depends on the angle $\Theta_T$ between the dual-polarized transmitting antennas used in the transmitter 110 and the constellation used for signal transmission, and is not affected by the angle $\Theta_R$ between the dual-polarized receiving antennas of the receiver 120.

As such, in the system for transmitting and receiving multi-input multi-output and the method for transmitting and receiving multi-input multi-output according to the exemplary embodiments of the present invention, it is possible to provide the environment to minimize the error probability while increasing the transmission capacity by controlling the angle between the dual-polarized transmitting antennas to dispose the dual-polarized transmitting antennas and transmitting the signal by selecting the antenna using the at least one virtual data stream, when the signal is transmitted and received through the dual-polarized antenna.

The exemplary embodiments of the present invention as describe above are not implemented only by the system and the method, and may be implemented by programs realizing the functions corresponding to the components of the exemplary embodiments of the present invention or a recording medium recorded with the programs.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting and receiving multi-input multi-output in a wireless backhaul network using a transmitter having a plurality of pairs of dual-polarized transmitting antennas and a receiver having a plurality of pairs of dual-polarized receiving antennas, comprising:

selecting and activating one pair of the plurality of pairs of dual-polarized transmitting antennas of the transmitter using a bit signal that is of a length of $\log_2 N_T$ bits $N_T$ being the number of pairs of the plurality of pairs of dual-polarized transmitting antennas;

transmitting a signal through the selected pair of dual-polarized transmitting antennas, the signal including the bit signal and a data signal that is of a length of 2 $\log_2\Omega$ bits, $\Omega$ being the number of bits of a constellation corresponding to a modulation scheme of the data signal; and selecting one of the plurality of pairs of dual-polarized receiving antennas of the receiver corresponding to the selected pair of dual-polarized transmitting antennas, and receiving the signal transmitted from the transmitter using the selected pair of dual-polarized receiving antennas.

2. The method of claim 1, wherein the transmitting a signal includes transmitting a quadrature amplitude modulation (QAM) symbol.

3. The method of claim 1, wherein the receiving the signal includes detecting a signal by applying a maximum likelihood (ML) signal detection technique to the received signal.

4. The method of claim 3, wherein the selecting the pair of dual-polarized receiving antennas includes
when an angle between the selected pair of dual-polarized transmitting antennas of the transmitter is set to minimize an error probability of the receiver, selecting a pair of dual-polarized receiving antennas having an angle relatively similar to the angle between the selected pair of dual-polarized transmitting antennas.

5. A method for transmitting and receiving multi-input multi-output in a wireless backhaul network using a transmitter having a plurality of pairs of dual-polarized transmitting antennas and a receiver having a plurality of pairs of dual-polarized receiving antennas, comprising:
transmitting, by one pair of the plurality of pairs of dual-polarized transmitting antennas, a virtual data stream, the virtual data stream including a bit signal that is of a length of $\log_2 N_T$ bits and a data signal that is of a length of $2 \log_2 \Omega$ bits, $N_T$ being the number of pairs of the plurality of pairs of dual-polarized transmitting antennas, $\Omega$ being the number of bits of a constellation corresponding to a modulation scheme of the data signal; and
receiving, by one pair of the plurality of pairs of dual-polarized receiving antennas selected corresponding to the one pair of dual-polarized transmitting antennas, the transmitted virtual data stream.

6. The method of claim 5, wherein in the transmitting, the virtual data stream is transmitted using 4-QAM (quadrature amplitude modulation) constellation or 16-QAM constellation.

7. The method of claim 6, wherein the transmitter is disposed by controlling an angle between the pair of the plurality of dual-polarized transmitting antennas of the transmitter so as to minimize an error probability of the receiver.

8. The method of claim 7, wherein the error probability is associated with the angle between the pair of the plurality of dual-polarized transmitting antennas or the constellation.

9. A system for transmitting and receiving multi-input multi-output, comprising:
a transmitter including a plurality of pairs of dual-polarized transmitting antennas, the transmitter being configured to
select and activate one of the plurality of pairs of dual-polarized transmitting antennas using a bit signal that is of a length of $\log_2 N_T$ bits $N_T$ being the number of pairs of the plurality of pairs of dual-polarized transmitting antennas, and
transmitting a signal through the selected pair of dual-polarized transmitting antennas, the signal including the bit signal and a data signal that is of a length of $2 \log 2\Omega$ bits, $\Omega$ being the number of bits of a constellation corresponding to a modulation scheme of the data signal; and
a receiver including a plurality of pairs of dual-polarized receiving antennas, the receiver being configured to receive the transmitted signal through one pair of the plurality of pairs of dual-polarized receiving antennas corresponding to the selected pair of dual-polarized transmitting antennas.

10. The system of claim 9, wherein each pair of dual-polarized transmitting antennas includes a vertical polarization antenna and a horizontal polarization antenna.

11. The system of claim 10, wherein the transmitter is so disposed that the plurality of pairs of dual-polarized transmitting antennas are inclined in a predetermined angle with respect to a reference dual-polarized transmitting antenna.

12. The system of claim 9, wherein the transmitter transmits a quadrature amplitude modulation (QAM) symbol.

13. The system of claim 12, wherein the transmitter is so disposed that angles between the dual-polarized transmitting antennas of the transmitter are the same, when using the 4-QAM constellation.

14. The system of claim 9, wherein the transmitter is so disposed that an angle between the selected pair of dual-polarized transmitting antennas becomes an angle to minimize an error probability of the receiver, when using 16-QAM constellation.

15. The system of claim 9, wherein
the transmitter includes a toll center which is connected to a core network, and
the receiver includes at least one remote node which wirelessly communicates with the toll center using a carrier frequency of 10 GHZ or more.

* * * * *